US012570226B2

(12) United States Patent　　　　(10) Patent No.:　US 12,570,226 B2
Jundt et al.　　　　　　　　　　　(45) Date of Patent:　　Mar. 10, 2026

(54) ENERGY SUPPLY MANAGEMENT SYSTEM FOR A VEHICLE, METHOD FOR DETERMINING THE COVERAGE OF AN ENERGY REQUIREMENT OF A LOAD UNIT OF THE ENERGY SUPPLY MANAGEMENT SYSTEM, AND COMPUTER PROGRAM PRODUCT

(71) Applicant: KNORR-BREMSE Systeme fuer Nutzfahrzeuge GmbH, Munich (DE)

(72) Inventors: Oliver Jundt, Hessigheim (DE); Huba Nemeth, Budapest (HU); Jens-Hauke Mueller, Velbert-Neviges (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 146 days.

(21) Appl. No.: 18/576,402

(22) PCT Filed: Jul. 6, 2022

(86) PCT No.: PCT/EP2022/068735
§ 371 (c)(1),
(2) Date: Jan. 4, 2024

(87) PCT Pub. No.: WO2023/280914
PCT Pub. Date: Jan. 12, 2023

(65) Prior Publication Data
US 2025/0065829 A1　　Feb. 27, 2025

(30) Foreign Application Priority Data
Jul. 9, 2021　　(DE) ..................... 10 2021 207 307.7

(51) Int. Cl.
　*B60R 16/023*　　　(2006.01)
　*B60R 16/03*　　　(2006.01)
　*H02J 15/00*　　　(2006.01)

(52) U.S. Cl.
CPC .......... *B60R 16/0231* (2013.01); *B60R 16/03* (2013.01); *H02J 15/003* (2013.01);
(Continued)

(58) Field of Classification Search
CPC .... B60R 16/0231; B60R 16/03; H02J 15/003; H02J 15/006; H02J 2310/40; Y02T 10/70; B60L 53/12; B60L 53/18
See application file for complete search history.

(56) References Cited

U.S. PATENT DOCUMENTS

| | | | |
|---|---|---|---|
| 10,759,298 B2 | 9/2020 | Wang et al. | |
| 2013/0218383 A1* | 8/2013 | Martin .............. | B60W 30/1882 903/903 |

(Continued)

FOREIGN PATENT DOCUMENTS

| | | |
|---|---|---|
| DE | 102 52 292 A1 | 6/2004 |
| DE | 10 2017 201 987 A1 | 8/2018 |

(Continued)

OTHER PUBLICATIONS

International Preliminary Report on Patentability (PCT/IB/326 & PCT/IB/373) issued in PCT Application No. PCT/EP2022/067356 dated Jan. 18, 2024, including English translation of Written Opinion (PCT/ISA/237) (8 pages).

(Continued)

*Primary Examiner* — Michael C Zarroli
(74) *Attorney, Agent, or Firm* — Crowell & Moring LLP

(57) ABSTRACT

An energy supply management system for a vehicle, includes at least one energy supply system with at least one energy supply unit and at least one load unit which can be supplied with energy by the at least one energy supply system in order to be supplied with energy. The energy supply management system is configured so as to determine the availability of functions of the at least one load unit, an
(Continued)

energy requirement based on the determined availability of functions of the at least one load unit, and the energy which can be provided by the at least one energy supply unit in order to cover the energy requirement.

13 Claims, 1 Drawing Sheet

(52) U.S. Cl.
CPC ......... *H02J 15/006* (2013.01); *H02J 2310/40* (2020.01); *Y02T 10/70* (2013.01)

(56)                References Cited

U.S. PATENT DOCUMENTS

| | | | |
|---|---|---|---|
| 2014/0336861 A1 | 11/2014 | Huber et al. | |
| 2016/0316621 A1 | 11/2016 | Fritz et al. | |
| 2018/0358839 A1* | 12/2018 | Perez | ......................... H02J 3/46 |
| 2022/0118855 A1* | 4/2022 | Naumann | ............... B60L 58/12 |
| 2022/0166244 A1 | 5/2022 | Schaefer | |

FOREIGN PATENT DOCUMENTS

| | | | |
|---|---|---|---|
| DE | 10 2019 112 706 A1 | 11/2020 | |
| DE | 10 2019 128 122 A1 | 4/2021 | |
| WO | WO 2013/034729 A1 | 3/2013 | |

OTHER PUBLICATIONS

International Preliminary Report on Patentability (PCT/IB/326 & PCT/IB/373) issued in PCT Application No. PCT/EP2022/068735 dated Jan. 18, 2024, including English translation of Written Opinion (PCT/ISA/237) (9 pages).
Canadian Office Action issued in Canadian Application No. 3,226,292 dated Feb. 6, 2025 (6 pages).
International Search Report (PCT/ISA/210) issued in PCT Application No. PCT/EP2022/068735 dated Oct. 21, 2022 with English translation (4 pages).
German-language Written Opinion (PCT/ISA/237) issued in PCT Application No. PCT/EP2022/068735 dated Oct. 21, 2022 with English translation (9 pages).
German-language Office Action issued in German Application No. 10 2021 207 307.7 dated Mar. 16, 2022 (8 pages).
International Search Report (PCT/ISA/210) issued in PCT Application No. PCT/EP2022/067356 dated Oct. 17, 2022 with English translation (4 pages).
German-language Written Opinion (PCT/ISA/237) issued in PCT Application No. PCT/EP2022/067356 dated Oct. 17, 2022 with English translation (9 pages).
German-language Office Action issued in German Application No. 10 2021 207 308.5 dated Mar. 14, 2022 (7 pages).

* cited by examiner

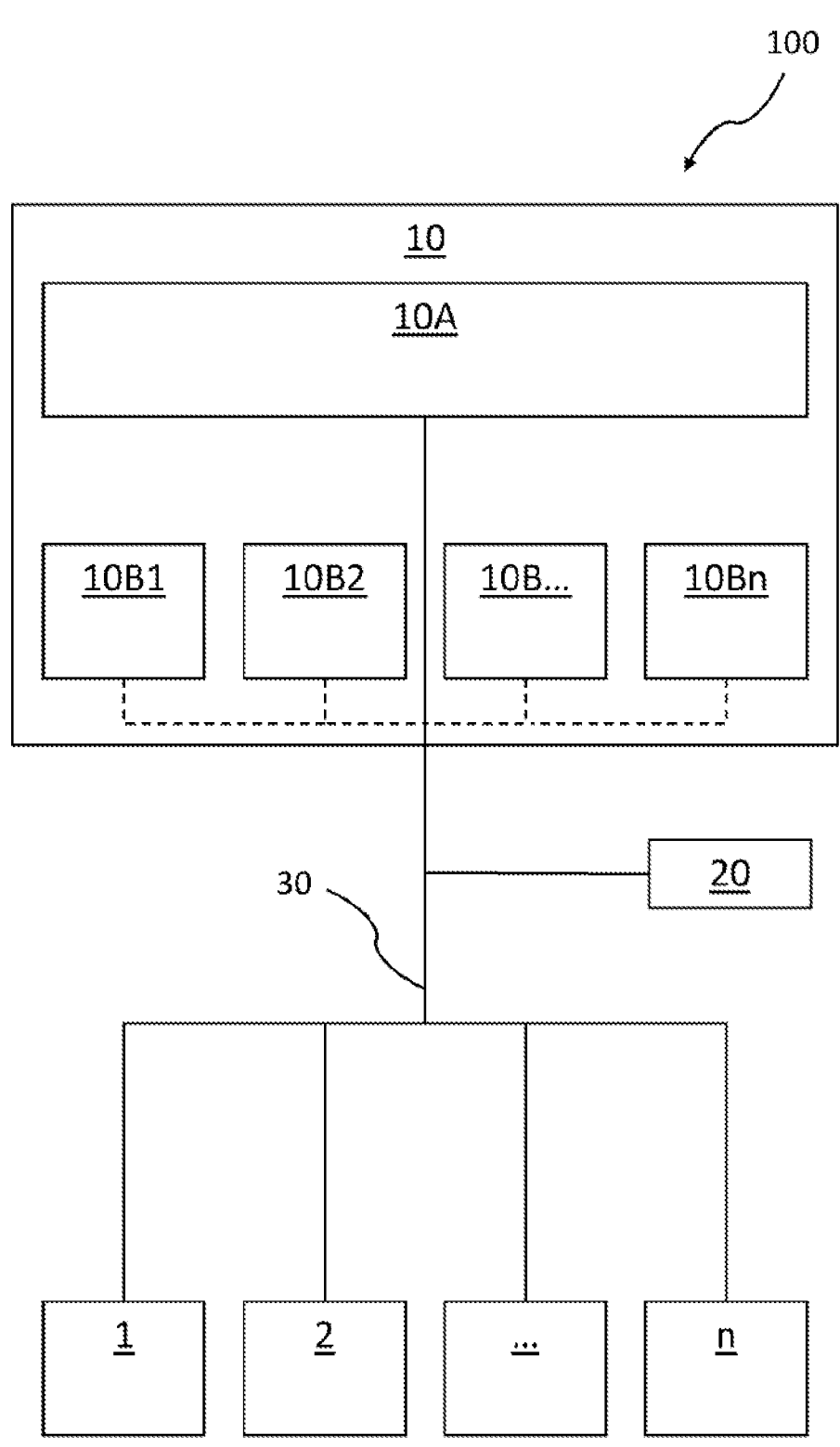

ENERGY SUPPLY MANAGEMENT SYSTEM FOR A VEHICLE, METHOD FOR DETERMINING THE COVERAGE OF AN ENERGY REQUIREMENT OF A LOAD UNIT OF THE ENERGY SUPPLY MANAGEMENT SYSTEM, AND COMPUTER PROGRAM PRODUCT

CROSS REFERENCE TO RELATED APPLICATION

This application contains subject matter related to U.S. application Ser. No. 18/576,436, entitled "Energy Supply Management System for a Vehicle, Energy Supply Management Method, and Computer Program Product," filed on Jan. 4, 2024.

BACKGROUND AND SUMMARY

The present invention relates to an energy supply management system for a vehicle, a method for determining the coverage of an energy requirement of at least one load unit of such an energy supply management system, and a computer program product for carrying out the method.

Due to the increasing electrification of vehicles, novel vehicle components and vehicle architectures are often used. For example, pneumatic or hydraulic systems are entirely or partially replaced by electrical or electronic components or functional groups. In addition, new requirements, in particular with regard to safety-relevant functions, result due to automated up to autonomous driving applications. A demand for a reliable energy supply management system for vehicles results therefrom, so that it can be ensured the energy supply is maintained at least for functions requiring a driving maneuver. This not only relates to an energy supply with electrical energy, but can similarly be applied to pneumatic, hydraulic, or hybrid systems which are linked thereto or independent.

To increase a level of security in maintaining a sufficient energy supply, especially with regard to safety-relevant functions, electrical energy supply systems, which are in particular embodied redundantly, are known, which have both a main energy supply unit and at least one auxiliary energy supply unit. A load connected to these supply units can thus be at least partially operated further via the auxiliary energy supply unit if the main energy supply unit fails.

In the event of a failure of the main energy supply unit and switching over or switching in the auxiliary energy supply unit, a corresponding error signal can be relayed to a higher-order processor unit. For example, an emergency program can be executed on the basis of such a signal relay, in order to transfer the vehicle into a safer state and which, for example, requires a stopping process of the vehicle or prompts the driver accordingly for this purpose. Since the auxiliary energy supply unit can usually only provide a limited amount of energy, the stopping process is initiated immediately or within a predetermined period of time in order to still ensure a sufficient energy supply until the vehicle stops. The predetermined period of time can correspond here to the capacity of the auxiliary energy supply unit. The actual energy requirement is not taken into consideration here.

The emergency program described above by way of example can have the result that a stopping process is initiated although sufficient energy is still available for a continued journey according to a presently necessary energy requirement. In particular, there is a risk that the vehicle will be stopped at an unfavorable point, which in the worst case means a hazard to the vehicle occupants or other road users. In particular, forced stopping can take place in a safety-critical area, although at least a sufficient amount of energy that can be provided would still have been available to reach a safer stopping point. Even if the stopping of the vehicle takes place outside a safety-critical area, the early stopping of the vehicle means in each case not fulfilling the driving task and thus, in particular, in the utility vehicle area not meeting deadlines or interrupting supply chains.

In consideration of the above statements, the present invention is based on the object of providing an energy supply management system for a vehicle, a method for determining the coverage of an energy requirement of at least one load unit of such an energy supply management system, and a computer program product for carrying out the method, by which the level of safety of the vehicle operation or also a range of the vehicle can be increased.

The object is achieved by an energy supply management system for a vehicle, a method for determining the coverage of an energy requirement of at least one load unit of such an energy supply management system, and a computer program product for carrying out the method according to the independent claims. The dependent claims contain advantageous refinements of the invention.

According to the invention, an energy supply management system for a vehicle has at least one energy supply system having at least one energy supply unit and at least one load unit, which can be supplied with energy for the energy supplied by the at least one energy supply system. The energy supply management system is configured to determine an availability of functions of the at least one load unit, determine an energy requirement based on the determined availability of functions of the at least one load unit, and determine energy that can be provided by the at least one energy supply unit to cover the energy requirement.

The energy supply system can have one or more energy supply units, via which electric, pneumatic, and/or hydraulic energy can be provided. An energy supply unit can accordingly be, for example, a battery or also a compressed air storage device for actuating a pneumatic brake actuator as part of a load unit. A corresponding load unit is accordingly also not restricted to an electronic unit or electrically operating load unit, but rather can also process pneumatic control signals. The energy supply units can also provide combined types of energy. The energy supply system can moreover contain further elements, such as rectifiers or inverters, in order to convert energy into the form of energy suitable for absorption by the at least one load unit, and/or can have linkage points for linking multiple energy supply units. The supply of the load unit with corresponding energy by the energy supply system can be carried out by a line connection of the load unit to the energy supply system or to at least one of the energy supply units of the energy supply system. The line connection can accordingly be a direct connection of the load unit to at least one of the energy supply units and/or an indirect connection via further components of the energy supply system, for example via a switching element. The line connection can be switchable in order to be able to connect or disconnect a connection of the energy supply system to the at least one load unit optionally or as needed. Alternatively or additionally, it can also be possible to supply inductive energy to the load unit, which can be supplied directly by corresponding arrangement of the energy supply system or at least one energy supply unit configurable in such a manner or indirectly via further transmission means.

The at least one load unit comprises at least one or more functions. Such a load unit can be a steering functional unit here, for example, which comprises specific functions for controlling, regulating, and/or other execution of a steering action. In other words, a steering functional unit accesses steering components of a vehicle. Alternatively or additionally, a load unit can also be designed as a braking functional unit and/or HAD functional unit (a highly automated driving functional unit or functional unit for highly automated driving), which accordingly have functions in order to access components of the braking devices and/or automated driving devices or to control, regulate, and/or actuate them. The functions of the at least one load unit can thus be signaling and/or direct actuator or mechanical functions. The functions can accordingly be implemented via control and/or regulating devices, such as processor units, and/or actuators.

The availability of functions is directed here to an available functional scope and/or an available functional status. The available functional scope relates to the availability of various functions. Meanwhile, the available functional status relates to the status of the respective individual function of a functional scope. The functional scope and/or the functional status can be specified by an operating mode of the vehicle. For example, driving at high velocity can require a greater functional scope and an expanded functional status in relation to driving at lower velocity. The functional status can relate in this context, for example, to an expansion of a regulation function, which is in turn part of the functional scope, and which takes into consideration more manipulated variables for improved braking reaction. In another example, a steering function has in a first functional status a performance range from a first minimum value to a first maximum value, wherein the performance range is expanded or reduced in a second functional status from a second minimum value to a second maximum value. In other words, the functional scope relates to the availability of one or more functions as such, while the functional status is directed to the present performance value or performance range of the respective function. Alternatively or additionally, the available functional scope and/or the functional status can also be changed by a failure or an error-related restriction.

According to the preceding statements, the availability of the functions can thus be determined by a determination of an operating mode of the vehicle and/or function monitoring of the functions of the at least one load unit. The function monitoring can be carried out in a sensor-based manner here. The load unit can also be designed to carry out a corresponding self-test in order to determine an availability of functions.

Based on the availability of functions, the energy supply management system can determine an energy requirement of the at least one load unit. The energy requirement can be determined here, for example, with respect to a predetermined route or a predetermined period of time using present or average driving data, such as a driving velocity, or a specified navigation route having energy consumption values which can be correspondingly expected or predicted. The determination of the energy requirement can be adaptable if, for example, data underlying the determination change. The energy requirement is preferably determined in consideration of a predetermined safety factor.

The energy that can be provided by the at least one energy supply unit to cover the energy requirement of the at least one load unit can be determined on the basis of a predetermined energy supply capacity of the at least one energy supply unit and/or corresponding status monitoring. An adaptation according to present capacity changes of the at least one energy supply unit can also be provided here.

Finally, the energy supply system according to the preceding configuration can alternatively or additionally also determine energy that can be provided to cover an energy requirement of the at least one load unit and can determine, on the basis of a determined energy requirement of the at least one load unit per time and/or per route unit, a remaining driving time and/or driving route, which could or can be adaptable according to present consumption data.

The basic concept of the invention is thus based on the determination of an energy requirement of the at least one load unit in consideration of the availability of functions, thus an available functional scope and/or functional status, of the load unit and the determination of the energy that can be provided for this purpose for the coverage by the at least one energy supply unit, in order to estimate a further availability of the functions and/or be able to provide measures for extending the coverage of the energy requirement. A further safe driving operation can be specified more accurately by the function-related comparison of the energy requirement to energy which can be provided.

In one embodiment, the at least one energy supply system has at least one main energy supply unit and at least one auxiliary energy supply unit. The energy supply management system is configured here to determine the energy that can be provided by the at least one auxiliary energy supply unit to cover the energy requirement.

Such an auxiliary energy supply unit is in particular provided as an energy supply unit redundant to the main energy supply unit. If the main energy supply unit fails, at least a part of the functions of the at least one load unit can still be supplied with energy in this way. The period of time of a further supply of the at least one load unit that can be provided via the auxiliary energy supply unit is limited, however, if the auxiliary energy supply unit has a lesser capacity in comparison to the main energy supply unit. Accordingly, the most accurate possible matching between energy requirement and energy that can be provided is advantageous in particular in this regard.

An energy supply system having a main energy supply unit and an auxiliary energy supply unit can be operated, for example, in the form of a redundant energy management system. For example, such a system is connected to a steering, a braking, and/or an HAD functional unit. The energy management system provides the energy supply of the functional units as load units. If the main energy supply unit fails or it has inadequate energy that can be provided, the at least one auxiliary energy supply unit can be switched in or, if possible, can take over the energy supply completely in place of the main energy supply unit.

Since in such a configuration the energy that can be provided by the at least one auxiliary energy supply unit is significantly dependent with regard to a failure of the main energy supply unit to maintain the functionality of the available functions or at least a predetermined part thereof for safety reasons, the energy that can be provided by the at least one auxiliary energy supply unit to cover this energy requirement is advantageously determined. In particular, the energy that can be provided by the at least one auxiliary energy supply unit to cover the energy requirement is first determined at a point in time when the main energy supply unit fails or is reduced in its performance. The present energy that can be provided can thus be specified if a partial consumption has already taken place due to other procedures. Alternatively or additionally, the energy that can be provided by the at least one auxiliary energy supply unit can also be determined in each case at a point in time after a connection of the auxiliary energy supply unit to a load unit has been disconnected again, in order to determine the energy which can then still be provided in each case. In such a case, the information about energy that can still be provided in this regard is available directly, without having to wait for present values to be determined first in the event of failure of the main energy supply unit. Accordingly, a determination of the energy requirement of the at least one load unit according to an availability of functions also advantageously relates to a point in time at which the at least one auxiliary energy supply unit is switched in or activated in order to provide energy to the at least one load unit. However, the energy requirement can also have been already determined beforehand, for example, as an average consumption, in order to then compare this to the energy that can be provided for the coverage.

In particular, the at least one energy supply system has multiple auxiliary energy supply units. The energy supply management system is configured in this constellation to determine the energy that can be provided by the at least one auxiliary energy supply unit to cover the energy requirement based on a selection of at least one auxiliary energy supply unit of the multiple auxiliary energy supply units. Preferably, in this case at least one other auxiliary energy supply unit of the multiple auxiliary energy supply units is excluded from the selection as at least one reserve auxiliary energy supply unit.

Accordingly, at least one of the auxiliary energy supply units can be selected according to predetermined or adapted criteria as at least one auxiliary supply unit to cover the energy requirement of the at least one load unit. Criteria for the selection of the at least one auxiliary energy supply unit can be, for example, a specified prioritization, a predetermined assignment of at least one of the auxiliary energy supply units to at least one load unit, energy that can be provided by the at least one auxiliary energy supply unit to cover an energy requirement, and/or an operating mode of the vehicle. With respect to the criterion of energy that can be provided, the selection can in particular take place with regard to which energy can still be provided if the auxiliary energy supply unit is already provided for the energy supply of at least one other load unit or is already actively connected thereto for the supply. The auxiliary energy supply unit can also stop the existing energy supply of a load unit and supply another, more important load unit according to a prioritization of load units. The selection of the at least one auxiliary energy supply unit is similarly adaptable by adapting the criteria.

In order to implement a further safety level, at least one other one of the multiple auxiliary energy supply units is initially excluded from the selection as a reserve auxiliary energy supply unit, so that in the event of further failure of the at least one selected auxiliary energy supply unit, at least one reserve auxiliary energy supply unit is still available. The reserve auxiliary energy supply unit can be redundant to the at least one selected auxiliary energy supply unit, in this example it can thus typically only be used for redundancy reasons. The reserve auxiliary energy supply unit can accordingly function in particular as a redundancy energy supply unit. Alternatively, however, it can also be a reserve auxiliary energy supply unit which is typically used, but can be enabled as a reserve auxiliary energy supply unit. The reserve auxiliary energy supply unit can be constructed in such a way that it can replace at least one other auxiliary energy supply unit, thus at least has the same capacity, or only partially substitutes for the at least one other auxiliary energy supply unit. Accordingly, multiple reserve auxiliary energy supply units can also be kept in reserve or can at least be temporarily determined as such, in order to be able to react flexibly to energy supply bottlenecks due to the at least one selected auxiliary energy supply unit. The at least temporary exclusion of the at least one auxiliary energy supply unit as a reserve auxiliary energy supply unit is in particular adaptable in order to also increase the flexibility. An adaptation can take place, for example, in dependence on the vehicle operating modes, the energy requirements of respective load units, and/or the energies of the auxiliary energy supply units that can be provided to cover the energy requirements.

According to one refinement, the energy supply management system is furthermore configured to determine the energy that can be provided respectively by the auxiliary energy supply units and/or groups thereof and on the basis of this determination to exclude the at least one other auxiliary energy supply unit or groups thereof from the selection as the at least one reserve auxiliary energy supply unit, in the case of which energy that can be provided is equal to or greater than the energy that can be provided of the at least one selected auxiliary energy supply unit.

The combination of multiple auxiliary energy supply units to form groups can take place on the basis of grouping criteria which are linked, for example, to a minimum energy that can be provided which is to be reached in total. The minimum energy can in turn be determined, for example, in dependence on the energy requirement of the at least one load unit. The grouping criteria and thus the group formation are in particular adaptable, for example, in dependence on the availability of the functions of the at least one load unit, which can cause not only an energy requirement, but also a prioritization, of an operating mode of the vehicle and/or a driving maneuver to be executed. A driving maneuver can be, for example, a specified driving route having operating requirements connected thereto, such as expected velocity profile, steering requirements, and average braking and acceleration maneuvers that can be expected. The specified driving route and operating requirements connected thereto can result here, for example, on the basis of a destination journey stored in a navigation device.

If the other auxiliary supply unit or a group of such other auxiliary energy supply units is initially excluded as a reserve auxiliary energy supply unit from a selection for a first supply, it can be switched in or activated in the event of an at least partial failure of the at least one auxiliary energy supply unit initially selected for the first supply, as already stated above. Because such a reserve auxiliary energy supply unit can provide energy which at least corresponds to the energy that can be provided by the at least one selected auxiliary energy supply unit, for which it functions as a reserve, a total failure of the at least one auxiliary energy supply unit can also be absorbed by the reserve auxiliary energy supply unit.

Alternatively or additionally, the energy supply management system is configured to exclude the at least one other auxiliary energy supply unit or groups thereof from the selection as the at least one reserve auxiliary energy supply unit, in the case of which energy that can be provided is at least in sum equal to or greater than the determined energy requirement.

The exclusion from the selection or the determination of the at least one reserve auxiliary energy supply unit thus takes place in dependence on the determined energy requirement. Accordingly, independently of the consideration of the initial at least one selected auxiliary energy supply unit, a reserve auxiliary energy supply unit can be determined. In other words, the initial exclusion of the at least one auxiliary energy supply unit as a reserve auxiliary energy supply unit takes place in comparison to a determined energy requirement, not or not only in comparison to initially selected auxiliary energy supply units.

The determination of the energy requirement and/or the energy that can be provided and which is to be substituted can thus be used as criteria for the determination of the reserve auxiliary energy supply unit. The criteria can be prioritized differently in dependence on various operating modes, driving maneuvers, and/or other destination specifications.

In one embodiment, the energy supply management system is configured to determine remaining maneuverability of the vehicle based on the determined energy requirement.

Maneuverability of the vehicle corresponds here to the property of the vehicle of executing a driving maneuver. This can relate, for example, to a driving route which is still executable, a steering activity or the number of steering maneuvers, the executability and the type of braking and acceleration processes, achievable velocities, and/or execution of automated driving assistance functions. The remaining maneuverability can be determined, for example, as a route which is still executable based on average data of a previous energy requirement and/or previous driving maneuvers.

In particular, the energy supply management system is configured to determine the energy requirement in dependence on predetermined driving maneuver scenarios.

Since the upcoming driving maneuvers each have effects on the energy requirement, the determination of the energy requirement in dependence on predetermined driving maneuver scenarios enables a consideration of future expectable driving maneuvers. A determination of the energy requirement can thus be based on predicted values. The predetermined driving maneuver underlying the determination of the energy requirement relates to a driving route still to be covered and/or remaining driving duration. The predetermined driving maneuver can result here, for example, from predetermined navigation data to reach a navigation destination or a minimum range.

A corresponding determination can in particular be carried out on the basis of navigation data. For example, at a point in time at which the energy requirement or its coverage is to be determined, the driving route still remaining to the navigation destination can be evaluated with respect to an expectable road type, an expectable velocity, expectable ascents and descents, required steering maneuvers and/or braking and acceleration processes, and steering, braking, and acceleration performances connected thereto. A predicted energy requirement for the functions required for executing the driving maneuvers or load units containing these functions result therefrom. Multiple driving maneuver scenarios can also be compared to driving maneuvers associated therewith, however, such as routing via an expressway or via a highway.

If the coverage of the energy requirement at least over one of the driving maneuver scenarios can be achieved, this can be selected, for example, for the further routing. Reaching the navigation destination would thus still be possible. If reaching the navigation destination cannot be seen in any of the driving maneuver scenarios, however, a remaining maneuverability can also be determined in accordance with the previous statements on the basis of the various energy requirements in dependence on different driving maneuver scenarios. A selection of a driving maneuver then to be pursued can then be performed with respect to a maximum remaining driving route or a minimum distance to the driving destination or reaching a safe parking position for the vehicle.

In particular, a central processor unit of the energy management system, the at least one energy supply system, and/or the at least one auxiliary energy supply unit is/are configured to determine the energy requirement, the energy that can be provided, and/or the remaining maneuverability.

The central processor unit of the energy management system can be a separate unit in which the energy requirement, the energy that can be provided, and/or the remaining maneuverability are determined. Alternatively, the central processor unit can also be part of a higher-order control device or integrated into another component. The determination of the energy requirement and/or the energy that can be provided can be carried out here by the central processor unit according to stored system data and/or in a sensor-based manner. The remaining maneuverability can then in turn be determined according to the determined energy requirement and the determined energy that can be provided on the basis of database entries and/or algorithms. The above functionalities, such as the determination of the energy requirement, the energy that can be provided, and/or the remaining maneuverability, can also be entirely or partially represented by the energy supply system and/or the at least one auxiliary energy supply unit. In the case of partial representation by individual ones of the mentioned components, a respective further data exchange can be carried out for bundling information according to the destination determination as needed. A simple data exchange can be performed by the central processor unit in consideration of further interfaces, for example if multiple energy supply systems are used. The further mentioned components can also be designed more simply here, in particular each individual component does not require the integration of processors or other electronics modules here. An alternative or additional embodiment of the at least one energy supply system and/or the at least one auxiliary energy supply unit can be provided, however, to reduce a dependency on the central processor unit or at least to offer a redundancy.

In one embodiment, the at least one load unit, the central processor unit, the at least one energy supply system, and/or the at least one auxiliary energy supply unit is/are configured to determine the availability of the functions of the at least one load unit.

Analogously to the preceding determination of the energy requirement, the energy that can be provided, and/or the remaining maneuverability, the availability of functions of the at least one load unit can similarly be determined by a predetermined system specification, possibly in consideration of changes in dependence on various operating modes of the vehicle, driving maneuvers, or other specified variable configurations of functions. Alternatively or additionally, sensor-determined recognition possibilities of the availability of functions or signaling functional queries can also be used here for a determination of the availability of functions. A change of the availability of functions deviating from the specifications, thus an expected availability of functions, for example due to a function failure, can also be determined by a sensor-based recognition possibility and/or a signaling functional query.

According to one refinement, the at least one load unit is configured to determine the availability of the functions of the at least one load unit and to transmit the determined availability of functions to the central processor unit, the at least one energy supply system, and/or the at least one auxiliary energy supply unit.

The at least one load unit can, as described above, for this purpose call, for example, its predetermined function configuration in a base state, read out the function configuration itself or the change information in dependence on its operating mode and/or specified function configurations changed in other ways, and/or have a self-test functionality for checking the availability of the functions. The possibility of determining an availability of functions deviating from specifications, simply due to a function failure or other type of malfunction, is also again provided here by the possibility of the self-test. The transmission of the data on the availability of functions to the central processor unit, the at least one energy supply system, and/or the at least one auxiliary energy supply unit can take place directly or indirectly, for example via interposed signal or data processor units. The transmission is carried out by means of typical wired and/or wireless signal transmission means. The signal transmission means can be designed for bidirectional or unidirectional signal transmission.

In particular, the energy supply management system is configured such that the determination of the availability of functions is limitable to the determination of the availability of safety-relevant and/or safety-critical functions.

Safety-relevant functions contribute to the safety of the vehicle operation. They thus increase the safety of the vehicle operation, their failure does not make the vehicle operation impossible, however. Meanwhile, safety-critical functions are required for operation of a vehicle, i.e. the vehicle operation is to be stopped in the event of their failure. Grouping functions as safety-relevant or safety-critical functions can be adaptable, for example in dependence on an operating mode of the vehicle or a driving maneuver. For example, a driving assistant system, such as a distance measurement, can be safety-critical in an autonomous driving mode of a vehicle, while it is only still safety-relevant, if at all, when the vehicle control is taken over by a driver. Grouping functions as safety-relevant or safety-critical functions can also be dependent on whether a specific function is substitutable by another function which is available. If a steering function of a steering actuator of the vehicle can be at least partially substituted, for example, by a braking function, the steering function can only still be safety-relevant at least in a predetermined range.

The effort for determining the availability of functions can be reduced by the limitation of the determination of the availability of functions to the determination of the availability of safety-relevant and safety-critical functions. A further reduction of the required effort is carried out by the further restriction to solely safety-critical functions.

In one embodiment, the energy supply management system is configured such that the determination of the energy requirement is limitable to the determination of the energy requirement for safety-relevant and/or safety-critical functions.

If only safety-relevant and safety-critical functions are still taken into consideration for the determination of the energy requirement, the energy that can be provided to cover this energy requirement can result, for example, in an increase of the remaining maneuverability. Upon further limitation to the determination of the energy requirement restricted to safety-critical functions, the remaining maneuverability can be further improved. Therefore, at least in an emergency, the safety-relevant and/or safety-critical functions can still be supplied with energy and ensure a remaining maneuverability.

According to one embodiment, the energy supply management system is configured to determine the availability of functions of the at least one load unit, the energy requirement based on the availability of functions of the at least one load unit, the energy that can be provided by the at least one energy supply unit to cover the energy requirement, and/or the remaining maneuverability of the vehicle based on the determined energy requirement continuously, periodically, or in an event-dependent manner, in particular in dependence on a change in the availability of functions and/or the energy that can be provided.

Since the availability of functions of the at least one load unit, the energy requirement based on the availability of functions of the at least one load unit, the energy that can be provided by the at least one energy supply unit to cover the energy requirement, and/or the remaining maneuverability of the vehicle can change based on the determined energy requirement over time, for example in dependence on executed driving maneuvers and/or a change of an operating mode of the vehicle, it can be advantageous to repeat corresponding determinations. A continuous determination enables continuous updating here but requires a corresponding data processing capacity. Periodic or event-dependent determinations of the above-mentioned variables can represent a compromise here. An event-dependent determination relates, for example, to a change in the availability of functions and/or the energy that can be provided. Other events can be a change of a driving route to a destination, route disturbances, and/or driving maneuvers lying outside an average range, which result in an increased energy requirement. The various types of the determinations can be applied to all or only a part of the variables to be determined.

In a further aspect, the present invention relates to a method for determining the coverage of an energy requirement of at least one load unit of an above-described energy supply management system of a vehicle. The method comprises the following steps:

determining an availability of functions of the at least one load unit, determining an energy requirement of the at least one load unit based on the determined availability of the functions of the at least one load unit, and determining the coverage of the energy requirement of the at least one load unit based on a determination of energy that can be provided by the at least one energy supply unit.

The advantages of the method result similarly to the description of the energy supply management system corresponding thereto, which is configured accordingly to execute the method steps. In particular functionally worded features of the corresponding energy supply management system can be viewed separately as features of the method.

According to one refinement of the method, the determination of the availability of functions of the at least one load unit, the energy requirement of the at least one load unit based on the determined availability of the functions of the at least one load unit, and/or the energy that can be provided by the at least one energy supply unit to cover the energy requirement is restricted to predetermined functions, in particular safety-relevant and/or safety-critical functions.

The method can thus be simplified in relation to a determination with respect to all functions fundamentally available via the at least one load unit.

Further embodiments of the method and advantages connected thereto in turn result analogously to the above-described functionalities of the energy supply management system.

In a further aspect, the present invention relates to a computer program product having a program code stored on a machine-readable carrier for carrying out the above-described method.

Vehicles may in particular be retrofitted in a simple manner via this. If the availability of functions is alternatively or additionally determined in a sensor-based manner, sensors which are already installed can also be controlled via the program and/or corresponding data can be read out.

The invention will be explained in more detail hereinafter with reference to the appended FIGURE.

BRIEF DESCRIPTION OF THE DRAWING

FIG. 1 is a schematic representation of an energy supply management system according to an exemplary embodiment of the invention.

DETAILED DESCRIPTION OF THE DRAWING

FIG. 1 shows a schematic representation of an energy supply management system 100 according to an exemplary embodiment. The energy supply management system 100 comprises an energy supply system 10, multiple load units 1, 2, . . . , n, which are supplied with energy via a line connection 30 by the energy supply system 10, and a central processor unit 20.

The energy supply system 10 has a main energy supply unit 10A and multiple auxiliary energy supply units 10B1, 10B2, 10B . . . , 10Bn. The energy supply system 10 shown here is configured as a redundant energy management system. Accordingly, the load units 1, 2, . . . , n are supplied with energy via the line connection 30 by the main energy supply unit 10A in normal operation, i.e. in a disturbance-free state of the main energy supply unit 10A. In the event of failure or an energy drop of the main energy supply unit 10A, at least one of the multiple auxiliary energy supply units 10B1, 10B2, 10B . . . , 10Bn can then be switched onto the line connection 30, which is indicated by the dashed line connection in FIG. 1. The switching on can be carried out, for example, by corresponding switching elements and/or an activation of the respectively provided auxiliary energy supply unit 10B1, 10B2, 10B . . . , 10Bn.

The energy supply management system 100 comprises as load units 1, 2, . . . , n a steering functional unit 1, a braking functional unit 2, and an HAD functional unit n. Further functional units are solely indicated in FIG. 1. Each of the load units 1, 2, . . . , n has a predetermined functional scope according to its respective base configuration. The steering functional unit 1 has here as an example a steering control function, a steering assistance function, a steering monitoring function, and multiple steering comfort functions, such as an active reset function of the steering, individual setting functions, an active interference compensation function, or a pull-drift compensation function. The individual functions in turn have a predetermined maximum functional range, which cannot or should not always be used to its full extent due to a control or an error. The functional range available as a result is a functional status. For example, a steering control function can be limited to a smaller steering angle range than is predetermined in the base configuration or a dynamic range of the steering can be decreased by reducing the power consumption at lower driving velocities. The respective active functional scope and active functional status are comprised as availability of functions. In an alternative embodiment, only the active functional scope can also be determined under the assumption of availability of the maximum functional range or the active functional status can be determined under the assumption of availability of the entire functional scope as availability of functions.

In the present embodiment, the availability of the functions is continuously determined via the respective load unit 1, 2, . . . , n itself. The determination of the availability of functions takes place here by way of example via a driving operation specified to the respective load unit 1, 2, . . . , n, which predetermines availability of the functions. In a driver operation, a manual steering assistance is available as a function by way of example here for the steering functional unit 1 and in an autonomous driving operation, the manual steering assistance is deactivated and a change is made to solely a steering angle function. Depending on the driving operation, the brake reserve pressure function of the brake functional unit 2 can also decrease or increase a corresponding pressure level from a first level value to a second level value. The first level value can be 10 bar and/or the second level value can be 8 bar. The determined availability of functions is also continuously transmitted by the load units 1, 2, . . . , n to the central processor unit 20. The transmission takes place here via the line connection 30, which is thus designed not only for energy supply, but also for signal transmission. Alternatively, the signal transmission can also take place via a separate signal line and/or wirelessly. In addition to continuously determining and transmitting the information on the availability of functions, determination and/or transmission can also take place in an event-dependent manner, for example transmission of the availability of functions can be provided only in cases in which at least one load unit has determined a change of the availability of functions.

The central processor unit 20 determines an energy requirement of the load units 1, 2, . . . , n from the availability of functions of the load units 1, 2, . . . , n. In the present embodiment, the processor unit 20 is configured to determine the availability of respective presently safety-relevant and safety-critical functions from the availability of the functions and accordingly to also determine or distinguish a respective energy consumption for the overall availability of functions, the availability of safety-relevant functions, and the availability of safety-critical functions. Moreover, the central processor unit 20 is configured to determine the respective energy requirement in dependence on various driving maneuvers, for example in the case of an expressway journey or a journey via highways to a predetermined destination. In addition to the determination of the energy requirements, the processor unit 20 also determines the energy that can be respectively provided by the main energy supply unit 10A and auxiliary energy supply units 10B1, 10B2, 10B . . . , 10Bn to cover the energy requirement. In principle, the main energy supply unit 10A is configured such that it covers the energy requirement according to the overall availability of functions. If the processor unit determines that the main energy supply unit 10A fails or the energy that can be provided thereby is no longer sufficient for the coverage, it can switch on at least one of the auxiliary energy supply units 10B1, 10B2, 10B . . . , 10Bn to the connecting line 30 in order to at least temporarily compensate for the failure or the reduced energy provision capability of the main energy supply unit 10A. The temporary compensation is dimensioned here according to the driving maneuver still to be executed or the remaining maneuverability of the vehicle connected thereto. If the sum of the energy that can be provided by the auxiliary energy supply units 10B1, 10B2, 10B . . . , 10Bn is not sufficient for the overall availability of functions to reach a predetermined driving destination, the remaining maneuverability is determined by the processor unit in consideration of safety-relevant and safety-critical functions. If the remaining maneuverability is still insufficient at least to reach a safe parking place, the determination of the remaining maneu-verability is limited further to the energy requirement for an availability of safety-critical functions.

The processor unit 20 is configured in the present embodi-ment such that for the determination of the by the auxiliary energy supply units 10B1, 10B2, 10B . . . , 10Bn in particularly safety-critical driving maneuvers and/or operating modes, for example a journey at high velocity using an autonomous driving operation and/or during platooning, it initially does not take into consideration at least one auxil-iary energy supply unit 10B1, 10B2, 10B . . . , 10Bn. Accordingly, this at least one auxiliary energy supply unit 10B1, 10B2, 10B . . . , 10Bn is also initially not selected to be switched onto the line connection 30. The at least one non-selected auxiliary energy supply unit 10B1, 10B2, 10B . . . , 10Bn is then used as a reserve auxiliary energy supply unit for the case of the failure of the at least one selected auxiliary energy supply unit 10B1, 10B2, 10B . . . , 10Bn. In an alternative embodiment, alternatively or additionally to providing a reserve auxiliary energy supply unit, the energy that can be provided by the auxiliary energy supply units 10B1, 10B2, 10B . . . , 10Bn is determined with a safety factor, which provides a sufficient buffer.

The invention is not restricted to the described embodi-ments. Although various functions are mentioned in the above-described embodiment for various load units, the availability of functions is not restricted thereto. For example, additional or alternative functions can also be provided, such as a lane keeping function of a steering functional unit. The load units are also not restricted to the mentioned functional units, but can also comprise other functional units, such as a lighting functional unit for front and rear lights.

LIST OF REFERENCE SIGNS 1, 2, . . . , n load unit
10 energy supply system
10A main energy supply unit
10B1, 10B2, . . . , 10Bn auxiliary energy supply unit
20 central processor unit
30 line connection
100 energy supply management system

The invention claimed is:

1. An energy supply management system for a vehicle, comprising:
at least one energy supply system having at least one energy supply unit; and
at least one load unit, which is able to be supplied with energy by the at least one energy supply system, wherein
the energy supply management system is configured to:
determine an availability of functions of the at least one load unit,
determine an energy requirement based on the deter-mined availability of functions of the at least one load unit, and determine energy that is able to be provided by the at least one energy supply unit to cover the energy requirement,
wherein the at least one energy supply system has at least one main energy supply unit and at least one auxiliary energy supply unit, and
the energy supply management system is further config-ured to:
determine the energy that is able to be provided by the at least one auxiliary energy supply unit to cover the energy requirement, and
wherein the at least one energy supply system has mul-tiple auxiliary energy supply units, and
the energy supply management system is still further configured to:
determine the energy that is able to be provided by the at least one auxiliary energy supply unit to cover the energy requirement based on a selection of at least one auxiliary energy supply unit of the multiple auxiliary energy supply units, while at least one other auxiliary energy supply unit of the multiple auxiliary energy supply units is excluded from the selection as at least one reserve auxiliary energy supply unit.

2. The energy supply management system according to claim 1, wherein
the energy supply management system is further config-ured to:
determine the energy that is able to be provided respec-tively by the auxiliary energy supply units and/or groups thereof, and, on the basis of the determina-tion, exclude the at least one other auxiliary energy supply unit or groups thereof from the selection as the at least one reserve auxiliary energy supply unit, in a case of which energy that is able to be provided is equal to or greater than the energy that is able to be provided by the at least one selected auxiliary energy supply unit.

3. The energy supply management system according to claim 2, wherein
the energy supply management system is further config-ured to:
exclude the at least one other auxiliary energy supply unit or groups thereof from the selection as the at least one reserve auxiliary energy supply unit, in a case of which energy that is able to be provided is at least in sum equal to or greater than the determined energy requirement.

4. The energy supply management system according to claim 1, wherein the energy supply management system is further configured to:
determine a remaining maneuverability of the vehicle based on the determined energy requirement.

5. The energy supply management system according to claim 1, wherein
the energy supply management system is further config-ured to:
determine the energy requirement in dependence on predetermined driving maneuver scenarios.

6. The energy supply management system according to claim 4, wherein
a central processor unit of the energy management sys-tem, the at least one energy supply system, and/or the at least one auxiliary energy supply unit is/are config-ured to determine the energy requirement, the energy that is able to be provided, and/or the remaining maneu-verability.

7. The energy supply management system according to claim 6, wherein
the at least one load unit, the central processor unit, the at least one energy supply system, and/or the at least one auxiliary energy supply unit is/are configured to determine the availability of the functions of the at least one load unit.

8. The energy supply management system according to claim 7, wherein the at least one load unit is configured to determine the availability of the functions of the at least one load unit and to transmit the determined availability of functions to the central processor unit, the at least one energy supply system, and/or the at least one auxiliary energy supply unit.

9. The energy supply management system according to claim 1, wherein the energy supply management system is configured such that the determination of the availability of functions is limitable to the determination of availability of safety-relevant and/or safety-critical functions.

10. The energy supply management system according to claim 1, wherein the energy supply management system is configured such that the determination of the energy requirement is limitable to the determination of the energy requirement for safety-relevant and/or safety-critical functions.

11. An energy supply management system for a vehicle, comprising:

at least one energy supply system having at least one energy supply unit; and at least one load unit, which is able to be supplied with energy by the at least one energy supply system, wherein the energy supply management system is configured to:

determine an availability of functions of the at least one load unit, determine an energy requirement based on the determined availability of functions of the at least one load unit, determine energy that is able to be provided by the at least one energy supply unit to cover the energy requirement, and determine the availability of functions of the at least one load unit, the energy requirement based on the availability of functions of the at least one load unit, the energy that is able to be provided by the at least one energy supply unit to cover the energy requirement, and/or a remaining maneuverability of the vehicle based on the determined energy requirement continuously, periodically, or in an event-dependent manner, in dependence on a change in the availability of functions and/or the energy that is able to be provided.

12. A method for determining coverage of an energy requirement of at least one load unit of an energy supply management system of a vehicle, wherein the energy supply system has at least one main energy supply unit and multiple auxiliary energy supply units, the method comprising:

determining an availability of functions of the at least one load unit;

determining an energy requirement of the at least one load unit based on the determined availability of the functions of the at least one load unit;

determining the coverage of the energy requirement of the at least one load unit based on a determination of energy that is able to be provided by the at least one energy supply unit;

determine the energy that is able to be provided by at least one auxiliary energy supply unit to cover the energy requirement, and determine the energy that is able to be provided by the at least one auxiliary energy supply unit to cover the energy requirement based on a selection of at least one auxiliary energy supply unit of the multiple auxiliary energy supply units, while at least one other auxiliary energy supply unit of the multiple auxiliary energy supply units is excluded from the selection as at least one reserve auxiliary energy supply unit.

13. The method according to claim 12, wherein the determination of the availability of functions of the at least one load unit, the energy requirement of the at least one load unit based on the determined availability of the functions of the at least one load unit, and/or the energy that is able to be provided by the at least one energy supply unit to cover the energy requirement, is restricted to predetermined safety-relevant and/or safety-critical functions.

* * * * *